United States Patent
Honma et al.

(10) Patent No.: US 9,620,297 B2
(45) Date of Patent: Apr. 11, 2017

(54) ELECTRICITY STORAGE DEVICE AND ELECTRODE MATERIAL THEREFOR

(71) Applicant: TOHOKU UNIVERSITY, Sendai-shi, Miyagi (JP)

(72) Inventors: Itaru Honma, Sendai (JP); Satoshi Mitani, Sendai (JP); Takaaki Tomai, Sendai (JP)

(73) Assignee: TOHOKU UNIVERSITY, Sendai-shi (JP)

( * ) Notice: Subject to any disclaimer, the term of this patent is extended or adjusted under 35 U.S.C. 154(b) by 35 days.

(21) Appl. No.: 14/773,425

(22) PCT Filed: Mar. 4, 2014

(86) PCT No.: PCT/JP2014/055471
§ 371 (c)(1),
(2) Date: Sep. 8, 2015

(87) PCT Pub. No.: WO2014/156511
PCT Pub. Date: Oct. 2, 2014

(65) Prior Publication Data
US 2016/0035498 A1    Feb. 4, 2016

(30) Foreign Application Priority Data
Mar. 28, 2013 (JP) ................ 2013-070369

(51) Int. Cl.
*H01G 11/30* (2013.01)
*H01G 11/34* (2013.01)
*H01G 11/32* (2013.01)

(52) U.S. Cl.
CPC ............ *H01G 11/34* (2013.01); *H01G 11/30* (2013.01); *H01G 11/32* (2013.01); *Y02E 60/13* (2013.01)

(58) Field of Classification Search
CPC ........ H01G 9/042; H01G 11/22; H01G 11/24; H01G 11/26; H01G 11/30
See application file for complete search history.

(56) References Cited

U.S. PATENT DOCUMENTS

| | | | | |
|---|---|---|---|---|
| 6,031,711 A * | 2/2000 | Tennent | ................ | B82Y 30/00 361/301.5 |
| 2009/0059474 A1* | 3/2009 | Zhamu | ................ | H01G 11/46 361/503 |
| 2009/0061312 A1* | 3/2009 | Zhamu | ................ | H01G 11/34 429/217 |

FOREIGN PATENT DOCUMENTS

| | | |
|---|---|---|
| JP | 6-56989 A | 3/1994 |
| JP | 10-294107 A | 11/1998 |
| JP | 2004-43528 A | 2/2004 |
| JP | 2004-137133 A | 5/2004 |
| JP | 2009-217992 A | 9/2009 |

(Continued)

OTHER PUBLICATIONS

International Search Report dated Apr. 8, 2014, issued in counterpart International Application No. PCT/JP2014/055471 (2 pages).

(Continued)

*Primary Examiner* — Dion R Ferguson
(74) *Attorney, Agent, or Firm* — Westerman, Hattori, Daniels & Adrian, LLP

(57) ABSTRACT

An electrode material for electricity storage devices includes: an active material including at least one of quinone having a halogen group and hydroquinone having a halogen group; and a porous body supporting the active material.

8 Claims, 22 Drawing Sheets

(56) References Cited

FOREIGN PATENT DOCUMENTS

JP          2012-155884 A    8/2012

OTHER PUBLICATIONS

Algharaibeh et al., "An asymmetric supercapacitor with anthraquinone and dihydroxybenzene modified carbon fabric electrodes", Electrochemistry Communications, 2011, pp. 147-149, vol. 13.
Algharaibeh et al., "An asymmetric anthraquinone-modified carbon/ruthenium oxide supercapacitor", Journal of Power Sources, 2009, pp. 640-643, vol. 187.
Komatsu et al., "Development of proton-rocking-chair supercapacitor using quinonic compounds", The Abstract of the 54th Battery Symposium in Japan, 2013, pp. 411.
Soneda et al., "Mesoporous Carbons From MgO Template Method for Capacitor Electrode", Book of Abstracts ACEPS-7, The 7th Asian Conference on Electrochemical Power Sources, Nov. 24-27, 2013, pp. 12.
Tomai et al., "Metal-free aqueous redox capacitor via proton rocking-chair system in an organic-based couple", Science Reports, Nature, 2014 (12 pages).

\* cited by examiner

POSITIVE ELECTRODE
ACTIVE MATERIAL

NEGATIVE ELECTRODE
ACTIVE MATERIAL

POSITIVE ELECTRODE
ACTIVE MATERIAL

NEGATIVE ELECTRODE
ACTIVE MATERIAL

TETRACHLOROHYDROQUINONE 2,5-DICHLORO-
3,6-ETHYLHYDROQUINONE

NAPHTHOHYDROQUINONE

R = HALOGEN GROUP
OR ALKYL GROUP 1,4-DICHLOROANTHRAQUINONE 1,5-DICHLOROANTHRAQUINONE 1,8-DICHLOROANTHRAQUINONE

ANTHRAQUINONE 5,12-NAPHTHACENEQUINONE

NAPHTHOQUINONE 5, 7, 12, 14-PENTACENETETRON 1, 2, 4, 8, 9, 11-HEXACHLORO-
5, 7, 12, 14-PENTACENETETRON 1, 2, 3, 4, 8, 9, 10, 11-OCTACHLORO-
5, 7, 12, 14-PENTACENETETRON 1, 2, 3, 4, 6, 8, 9, 10, 11, 13-OCTACHLORO-
5, 7, 12, 14-PENTACENETETRON

R = HALOGEN GROUP OR ALKYL GROUP

R = HALOGEN GROUP OR ALKYL GROUP

R = HALOGEN GROUP OR ALKYL GROUP

R = HALOGEN GROUP OR ALKYL GROUP

HYDROQUINONE

ELECTRICITY STORAGE DEVICE AND ELECTRODE MATERIAL THEREFOR

TECHNICAL FIELD

The present invention relates to an electricity storage device and an electrode material for the same, and relates to, for example, an electricity storage device including a porous body supporting quinone or hydroquinone and an electrode material for the same.

BACKGROUND ART

There has been known electrochemical capacitors using quinone-based compounds for the electrodes. For example, Non Patent Literature 1 discloses an electrochemical capacitor that uses a composite of 1,2-dihydroxybenzene and activated carbon for the positive electrode and a composite of anthraquinone and activated carbon for the negative electrode. Additionally, Non Patent Literature 2 discloses an electrochemical capacitor that uses a composite of ruthenium oxide and activated carbon for the positive electrode and a composite of anthracene and activated carbon for the negative electrode.

Patent Literature 1 discloses using a polymer to which a quinone-based compound is bonded for electrodes. Patent Literature 2 discloses a secondary cell that uses a 1,4,5,8-anthracenetetron compound having a hydrogen atom, an alkyl group or a halogen group or a 5,7,12,14-pentacenetetron compound having a hydrogen atom, an alkyl group or a halogen group for the positive electrode and lithium for the negative electrode.

CITATION LIST

Patent Literature

Patent Literature 1: Japanese Patent Application Publication No. 2009-217992
Patent Literature 2: Japanese Patent Application Publication No. 2012-155884

Non Patent Literature

Non Patent Literature 1: Electrochemistry Communications 13 (2011) 147-149
Non Patent Literature 2: Journal of Power Sources 187 (2009) 640-643

SUMMARY OF INVENTION

Technical Problem

The use of a quinone-based compound or a hydroquinone-based compound for both the positive electrode and the negative electrode, as disclosed in Non Patent Literature 1, is expected to enable to achieve a rocking-chair electrochemical capacitor in which protons conduct. The use of organic-based substances for the positive electrode and the negative electrode enables to minimize the use of metals. This enables to achieve an electricity storage device that does not use, for example, rare elements or toxic substances. However, even when a porous body supports quinone-based compounds or hydroquinone-based compounds, the quinone-based compounds or the hydroquinone-based compounds are eluted from the porous body. This reduces the lifetime of the electricity storage device.

The present invention has been made in view of the above problems, and aims to prolong the lifetime of an electricity storage device.

Solution to Problem

The present invention is an electrode material for electricity storage devices characterized by including: an active material including at least one of quinone having a halogen group and hydroquinone having a halogen group; and a porous body supporting the active material.

In the above configuration, the porous body may include activated carbon or nanocarbon. Additionally, in the above configuration, the halogen group may be a chloro group.

The present invention is an electricity storage device characterized in that at least one of a positive electrode and a negative electrode includes the electrode material.

The present invention is an electricity storage device characterized by including: a positive electrode that contains a positive electrode active material including at least one of quinone and hydroquinone, and a positive electrode porous body supporting the positive electrode active material; a negative electrode that contains a negative electrode active material including at least one of quinone and hydroquinone, and a negative electrode porous body supporting the negative electrode active material; and an electrolyte located between the positive electrode and the negative electrode, wherein the at least one of quinone and hydroquinone included in at least one of the positive electrode active material and the negative electrode active material has a halogen group.

In the above configuration, at least one of quinone and hydroquinone included in the negative electrode active material may include more benzene rings than at least one of quinone and hydroquinone included in the positive electrode active material.

In the above configuration, at least one of quinone and hydroquinone included in the negative electrode active material may have the halogen group.

In the above configuration, both at least one of quinone and hydroquinone included in the negative electrode active material and at least one of quinone and hydroquinone included in the positive electrode active material may have the halogen group.

Advantageous Effects of Invention

The present invention enables to prolong the lifetime of an electricity storage device.

DESCRIPTION OF EMBODIMENTS

Figure 1A:
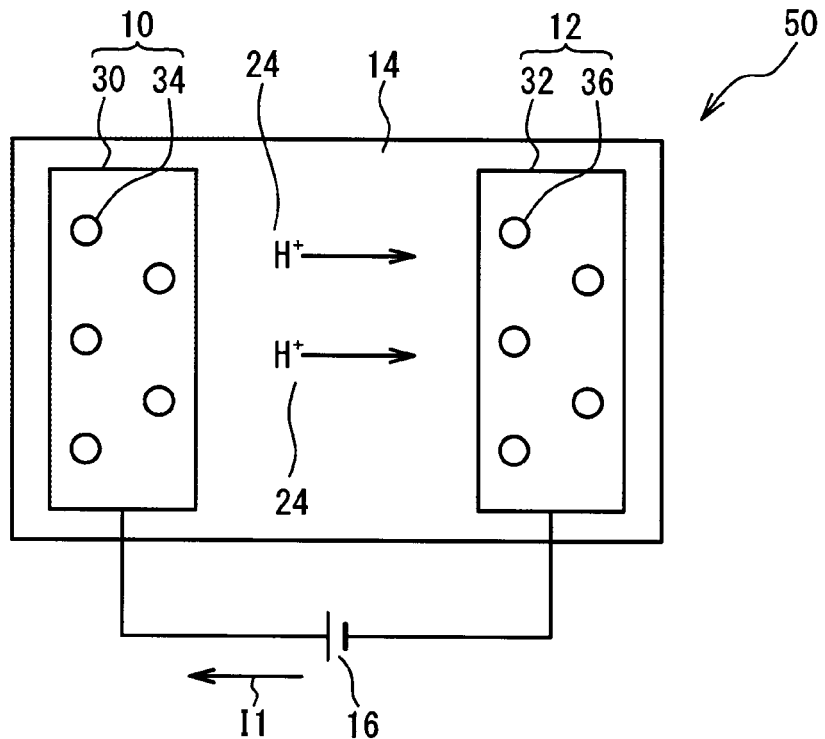
FIG. 1A and FIG. 1B are schematic views of an electricity storage device in accordance with embodiments of the present invention.
Figure 1B:
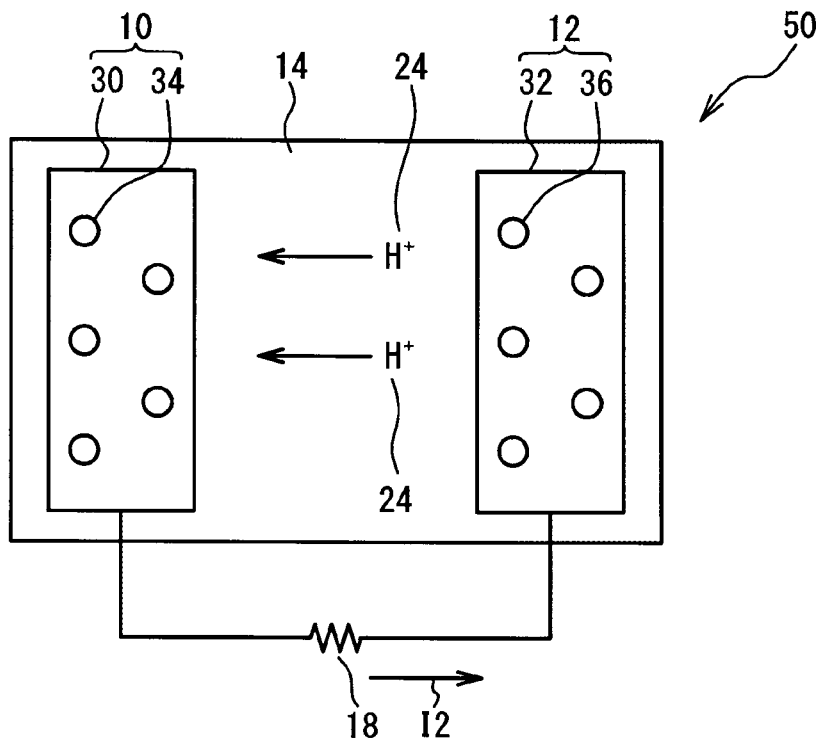

FIG. 1A and FIG. 1B are schematic views of an electricity storage device in accordance with embodiments of the present invention. As illustrated in FIG. 1A and FIG. 1B, an electricity storage device 50 includes a positive electrode 10, a negative electrode 12, and an electrolyte 14. The positive electrode 10 contains a positive electrode porous body 30 and positive electrode active materials 34. The positive electrode porous body 30 supports the positive electrode active materials 34. The negative electrode 12 contains a negative electrode porous body 32 and negative electrode active materials 36. The negative electrode porous body 32 supports the negative electrode active materials 36. As illustrated in FIG. 1A, to charge the electricity storage device 50, a direct current power source 16 is connected to the electricity storage device 50 so that a positive voltage is applied to the positive electrode 10 and a negative voltage is applied to the negative electrode 12. This allows an electrical current I1 to flow from the negative electrode 12 to the positive electrode 10 via the direct current power source 16. Protons 24 ($H^+$) conduct through the electrolyte 14 from the positive electrode 10 to the negative electrode 12. As illustrated in FIG. 1B, to discharge the electricity storage device 50, a load 18 is connected between the positive electrode 10 and the negative electrode 12. This allows an electrical current I2 to flow through the load 18 from the positive electrode 10 to the negative electrode 12. The protons 24 ($H^+$) conduct through the electrolyte 14 from the negative electrode 12 to the positive electrode 10.

Figure 2A:
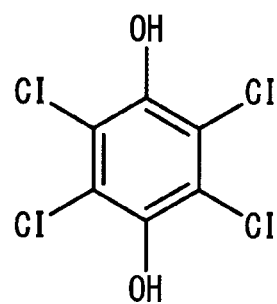
FIG. 2A is a diagram illustrating a positive electrode active material and a negative electrode active material in a discharged state.
Figure 2A:
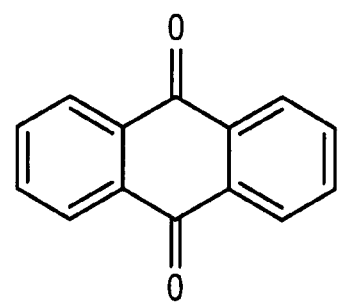
Figure 2B:
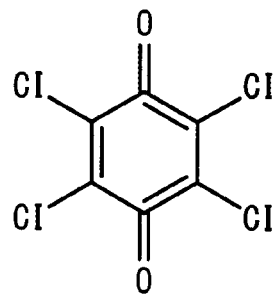
FIG. 2B is a diagram illustrating the positive electrode active material and the negative electrode active material in a charged state.
Figure 2B:
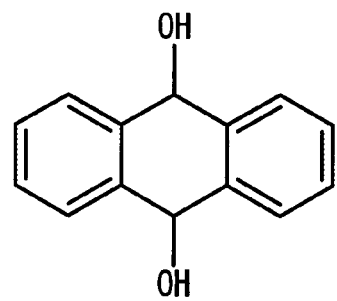

A description will be given of a case where tetrahydroquinone is used as the positive electrode active material 34 and anthraquinone is used as the negative electrode active material 36. FIG. 2A illustrates examples of the positive electrode active material and the negative electrode active material in a discharged state, and FIG. 2B illustrates examples of the positive electrode active material and the negative electrode active material in a charged state. As illustrated in FIG. 2A, in a discharged state, the positive electrode active material 34 is tetrachlorohydroquinone, and the negative electrode active material 36 is anthraquinone. As illustrated in FIG. 2B, when the electricity storage device 50 is charged, OH of tetrachlorohydroquinone emits an electron and a proton in the positive electrode 10, becoming O of quinone. The proton conducts through the electrolyte 14, reaching the negative electrode 12. In the negative electrode 12, O of quinone accepts the proton and the electron, becoming OH. Through the above reaction, the positive electrode active material 34 becomes tetrachloroquinone and the negative electrode active material 36 becomes anthrahydroquinone.

As described above, the positive electrode active material 34 is hydroquinone in a discharged state, is quinone in a charged state, and is a mixture of quinone and hydroquinone in the process of discharge or charge. The negative electrode active material 36 is quinone in a discharged state, is hydroquinone in a charged state, and is a mixture of hydroquinone and quinone in the process of discharge or charge. This enables to achieve an electricity storage device in which protons conduct.

Quinone and/or hydroquinone that is the positive electrode active material 34 and the negative electrode active material 36 is supported in the positive electrode porous body 30 and the negative electrode porous body 32 such as activated carbon. However, the electric storage performance of such electricity storage devices is degraded by repetition of charge/discharge cycles.

The inventors of the present invention thought that the reason why the electric storage performance is degraded was because quinone and/or hydroquinone is eluted into the electrolyte 14.

Accordingly, in the present embodiment, quinone and/or hydroquinone has a halogen group. As a halogen group has a large electron attracting property, the intermolecular force with a functional group such as carbon of the positive electrode porous body 30 and the negative electrode porous body 32 increases. Accordingly, quinone and/or hydroquinone becomes less eluted into the electrolyte 14.

As described above, the electrode material contained in at least one of the positive electrode 10 and the negative electrode 12 of the electricity storage device includes an active material including at least one of quinone having a halogen group and hydroquinone having a halogen group, and a porous body supporting the active material. This allows quinone and/or hydroquinone to be less eluted into the electrolyte 14. Therefore, the lifetime of the electricity storage device can be prolonged.

Furthermore, the positive electrode 10 contains the positive electrode active material 34 including at least one of quinone and hydroquinone, and the positive electrode porous body 30 supporting the positive electrode active material 34. The negative electrode 12 contains the negative electrode active material 36 including at least one of quinone and hydroquinone, and the negative electrode porous body 32 supporting the negative electrode active material 36. Furthermore, at least one of quinone and hydroquinone included in at least one of the positive electrode active material 34 and the negative electrode active material 36 has a halogen group. This configuration enables to provide an electricity storage device having a high energy density and a long lifetime.

Quinone and/or hydroquinone used in the present embodiment is a cyclic organic compound, and includes, for example, one or more benzene rings. Quinone and/or hydroquinone included in the positive electrode active material 34 preferably has a small number of benzene rings to decrease the reaction potential. Quinone and/or hydroquinone included in the negative electrode active material 36 preferably has a large number of benzene rings to increase the reaction potential. As described above, quinone and/or hydroquinone included in the positive electrode active material 34 preferably has a smaller number of benzene rings than quinone and/or hydroquinone included in the negative electrode active material 36. For example, quinone and/or hydroquinone included in the positive electrode active material 34 preferably has one benzene ring, and quinone and/or hydroquinone included in the negative electrode active material 36 preferably has three or more benzene rings.

When the positive electrode porous body 30 and/or the negative electrode porous body 32 is activated carbon, the π-π interaction between the benzene ring of quinone and/or hydroquinone and the benzene ring of the porous body allows quinone and/or hydroquinone to be less eluted into the electrolyte 14. Therefore, quinone and/or hydroquinone preferably includes a large number of benzene rings. However, as described previously, quinone and/or hydroquinone included in the positive electrode active material 34 preferably has a small number of benzene rings. This makes the π-π interaction between the positive electrode active material 34 and the positive electrode porous body 30 small. Therefore, quinone and/or hydroquinone included in the positive electrode active material 34 preferably has a halogen group.

Figure 3A:
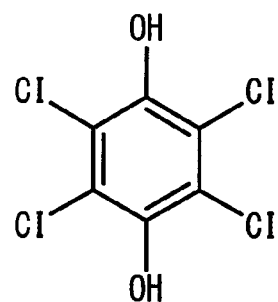
FIG. 3A through FIG. 3D illustrate chemical formulas of examples of hydroquinone included in the positive electrode active material.
Figure 3B:
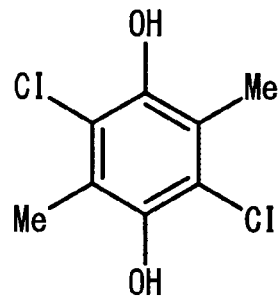
Figure 3C:
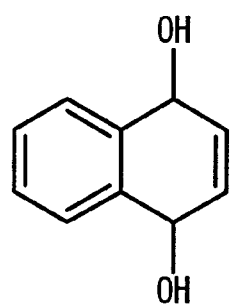
Figure 3D:
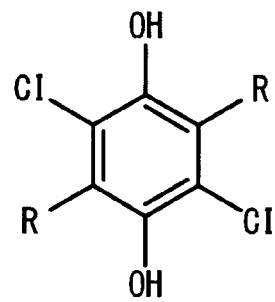

FIG. 3A through FIG. 3D illustrate chemical formulas of examples of hydroquinone included in the positive electrode active material. As illustrated in FIG. 3A through FIG. 3C, the positive electrode active material 34 is, for example, tetrachlorohydroquinone, 2,5-dichloro-3,6-ethylhydroquinone, or naphthohydroquinone. The positive electrode active material 34 may be hydroquinone of which R in the chemical formula illustrated in FIG. 3D is a halogen group, an alkyl group, or a hydrogen atom. FIG. 3A and FIG. 3B are examples of FIG. 3D.

FIG. 4A through FIG. 6D illustrate chemical formulas of examples of quinone included in the negative electrode active material. As illustrated in FIG. 4A through FIG. 4F, the negative electrode active material 36 is, for example, 1,4-dichloroanthraquinone, 1,5-dichloroanthraquinone, 1,8-dichloroanthraquinone, anthraquinone, 5,12-naphthacenequinone, or naphthoquinone.

As illustrated in FIG. 5A through FIG. 5D, the negative electrode active material 36 is, for example, 5,7,12,14-pentacenetetron, 1,2,4,8,9,11-hexachloro-5,7,12,14-pentacenetetron, 1,2,3,4,8,9,10,11-octachloro-5,7,12,14-pentacenetetron, or 1,2,3,4,6,8,9,10,11,13-octachloro-5,7,12,14-pentacenetetron.

Figure 4A:
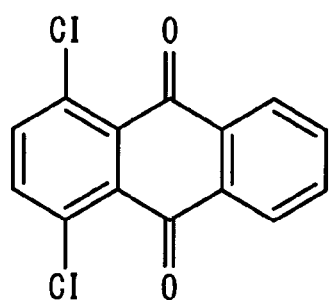
FIG. 4A through FIG. 4F illustrate chemical formulas of examples of quinone included in the negative electrode active material (No. 1)
Figure 4B:
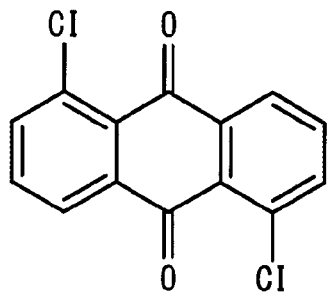
Figure 4C:
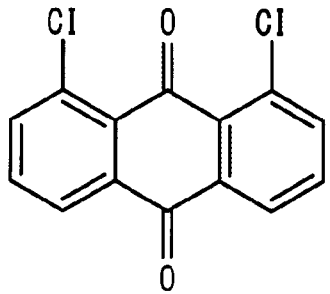
Figure 4D:
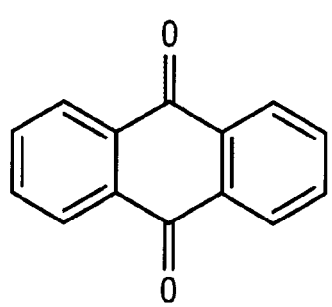
Figure 4E:
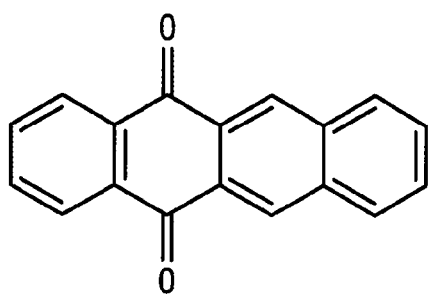
Figure 4F:
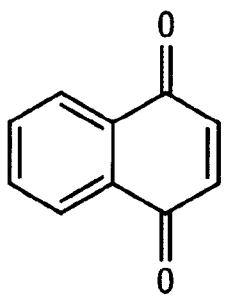
Figure 5A:
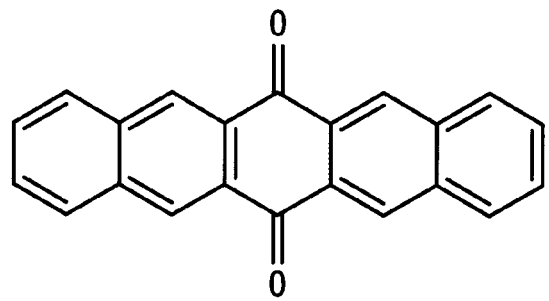
FIG. 5A through FIG. 5D illustrate chemical formulas of examples of quinone included in the negative electrode active material (No. 2)
Figure 5B:
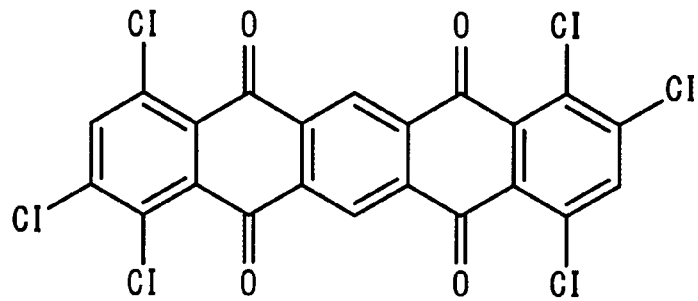
Figure 5C:
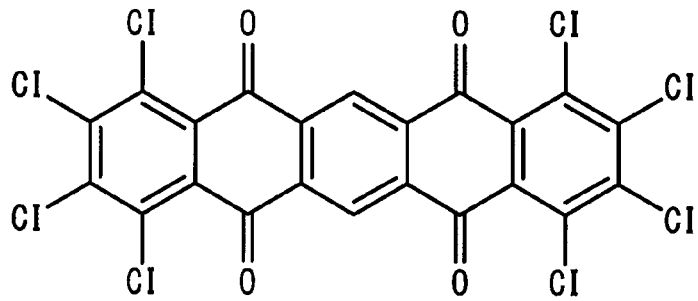
Figure 5D:
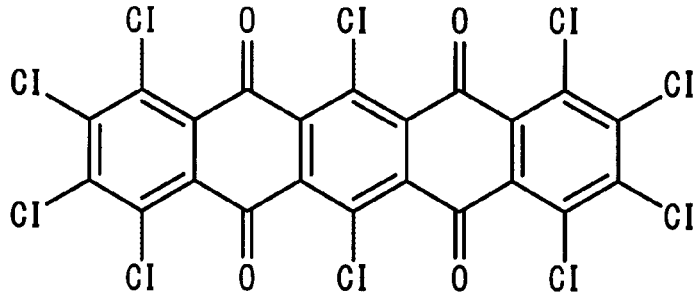
Figure 6A:
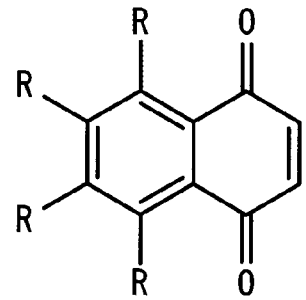
FIG. 6A through FIG. 6D illustrate chemical formulas of examples of quinone included in the negative electrode active material (No. 3)
Figure 6B:
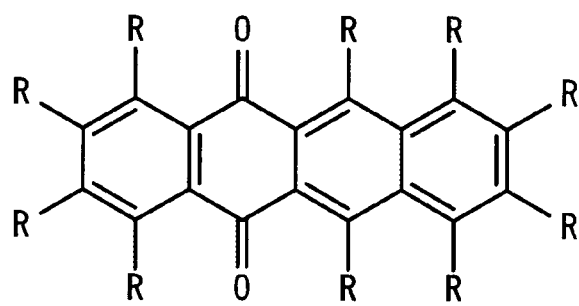
Figure 6C:
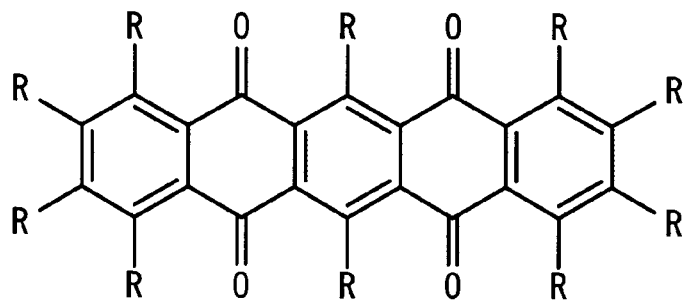
Figure 6D:
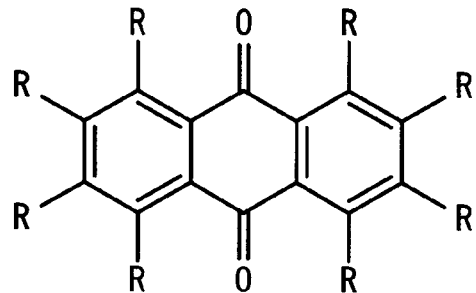

Furthermore, the negative electrode active material 36 may be hydroquinone of which R of the chemical formulas illustrated in FIG. 6A through FIG. 6D is a halogen group, an alkyl group, or a hydrogen atom. FIG. 4F is an example of FIG. 6A. FIG. 4E is an example of FIG. 6B. FIG. 5B through FIG. 5D are examples of FIG. 6C. FIG. 4A through FIG. 4D are examples of FIG. 6D.

In quinone, arrangements and the number of ketone structures and halogen groups may be freely selected. In hydroquinone, arrangements and the number of OH groups and halogen groups may be freely selected. Quinone and/or hydroquinone may have at least one of an alkyl group, a vinyl group, and an aryl group. The arrangement and the number of at least one of an alkyl group, a vinyl group, and an aryl group may be freely selected.

The halogen group is required to be at least one of a fluoro group, a chloro group, a bromo group, an iodine group, and an astato group. A chloro group, which has a moderate electron attracting property, is preferable as the halogen group.

The powder size of the positive electrode porous body 30 and/or the negative electrode porous body 32 is, for example, 2 μm to 100 μm. The positive electrode porous body 30 and/or the negative electrode porous body 32 preferably has a pore with a radius of 3 nm or less. The positive electrode porous body 30 and/or the negative electrode porous body 32 preferably includes activated carbon or nanometer-sized carbon (nanocarbon) so that the π-π interaction with quinone and/or hydroquinone occurs. The aggregation of nanocarbon forms air-spaces to form a porous body. At least one of, for example, a graphene, a carbon nanotube, and a carbon nanofiber is included as the nanocarbon.

The electrolyte 14 may be an aqueous electrolyte, a solid electrolyte, or an organic-based electrolyte. To conduct protons, the electrolyte 14 preferably has a pH of 7 or greater to express acidity. The electrolyte 14 preferably contains acid such as sulfuric acid, nitric acid, or hydrochloric acid. Additionally, to prolong the lifetime of the electricity storage device, the concentration of oxygen in the electrolyte 14 is preferably low.

First Embodiment

Figure 7:
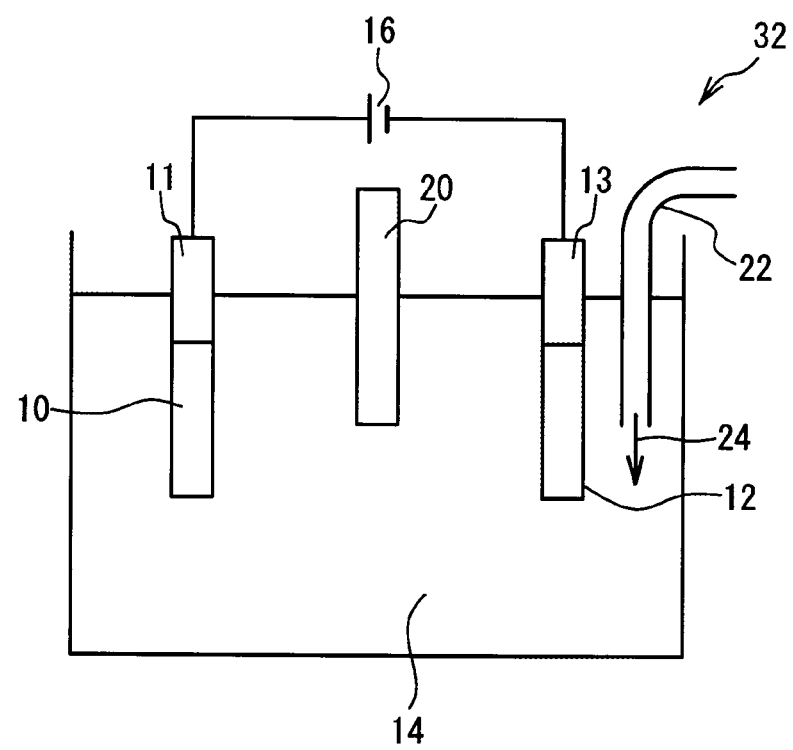
FIG. 7 illustrates an electricity storage device in accordance with first through fifth embodiments.

FIG. 7 illustrates an electricity storage device in accordance with a first through fifth embodiments. An electricity storage device 32 includes the positive electrode 10, a current collector 11, the negative electrode 12, a current collector 13, the electrolyte 14, a reference electrode 20, and a tube 22. The positive electrode 10 is connected to the direct current power source 16 or the load via the current collector 11, while the negative electrode 12 is connected to the direct current power source 16 or the load via the current collector 13. The current collector 11 is a gold (Au) mesh, and the current collector 13 is a gold (Au) mesh. The electrolyte 14 is sulfuric acid ($H_2SO_4$) aqueous solution. The reference electrode 20 is a mixture of silver (Ag) and silver chloride (AgCl). The tube 22 supplies nitrogen gas into the electrolyte 14 and bubbles nitrogen gas through the electrolyte 14. This process removes oxygen in the electrolyte 14.

The method of fabricating the positive electrode 10 and the negative electrode 12 in the first through fifth embodiments is the following.

Distributing quinone or hydroquinone and activated carbon in organic solvent (acetone in the present embodiment).

Evaporating the organic solvent at a temperature higher than the room temperature (at approximately 70° C. in the embodiment). This allows activated carbon to support quinone or hydroquinone.

Mixing activated carbon and a binder (PTFE in the embodiment).

Shaping the mixture of activated carbon and a binder.

Table 1 lists the material of the positive electrode 10, the material of the negative electrode 12, the weight ratio of the positive electrode 10 to the negative electrode 12, the concentration of sulfuric acid in the electrolyte 14, the reference electrode 20, and the C rate in the first embodiment.

TABLE 1

| Positive electrode | | Negative electrode | |
|---|---|---|---|
| Chloranol | 26 wt % | AQ | 26 wt % |
| Activated carbon 1 | 64 wt % | Activated carbon 1 | 64 wt % |
| PTFE | 10 wt % | PTFE | 10 wt % |
| Positive electrode/Negative electrode | | 1/1 | |
| Electrolyte | | 0.5 mol/l $H_2SO_4$ | |
| Reference electrode | | Ag/AgCl | |
| C rate | | 5 C (AQ basis) | |

As listed in Table 1, for the positive electrode 10, used were tetrachlorohydroquinone (Chloranol: TCHQ), activated carbon 1, and polytetrafluoroethylene (PTFE). For the negative electrode 12, used were anthraquinone (AQ), activated carbon 1, and PTFE. Activated carbon 1 is Maxsorb (registered trademark) having many pores with a radius of 3 nm or less, which is, however, relatively costly. The weight ratio of the positive electrode 10 to the negative electrode 12 was fixed at 1:1. The concentration of sulfuric acid in the electrolyte 14 was 0.5 mol/liter. The reference electrode 20 was a mixture of Ag and AgCl. The C rate used to measure charge characteristics and discharge characteristics was 5C on an AQ basis.

Figure 8:
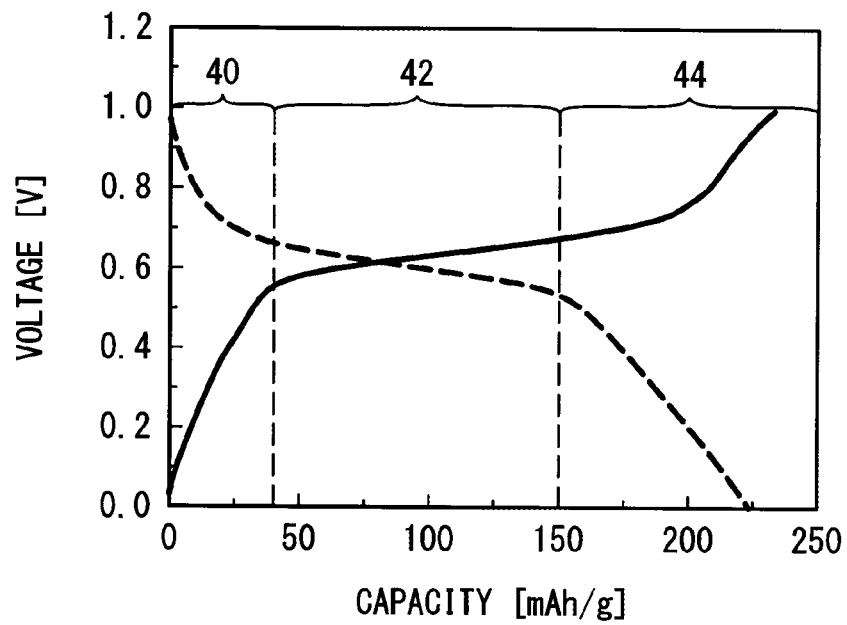
FIG. 8 is a graph of capacity versus voltage in the first embodiment.

FIG. 8 is a graph of capacity versus voltage in the first embodiment. The solid line exhibits a voltage between the positive electrode 10 and the negative electrode 12 during the charge process, and the dashed line exhibits a voltage between the positive electrode 10 and the negative electrode 12 during the discharge process. The capacitay is expressed in a capacity per unit mass of the positive electrode 10. As exhibited in FIG. 8, during the charge process, the voltage sharply increases till the capacity reaches approximately 40 mAh/g, gently increases between 40 mAh/g and approximately 180 mAh/g, and sharply increases after the capacity exceeds 180 mAh/g. During the discharge process, the voltage sharply decreases till the capacity reaches approximately 40 mAh/g, gently decreases between 40 mAh/g and approximately 150 mAh/g, sharply decreases again after the capacity exceeds 150 mAh/g, and becomes 0 V at approximately 220 mAh/g.

In the regions 40 and 44 where the voltage sharply decreases or sharply increases, electric charges are accumulated as an electric double layer capacitor. In the region 42 where the slope of the voltage is gentle, electric charges are accumulated as a rocking-chair type electrochemical capacitor in which protons conduct. As described above, the electricity storage device 52 of the first embodiment has functions as an electric double layer capacitor and a rocking-chair type electrochemical capacitor, thus having a large capacity. When a bipolar capacitance is calculated from FIG. 8, the bipolar capacitance as an electric double layer capacitor is 41.5 F/g, and the bipolar capacitance as an electrochemical capacitor is 104.3 F/g. Additionally, the maximum capacity is 220 mAh/g.

Figure 9:
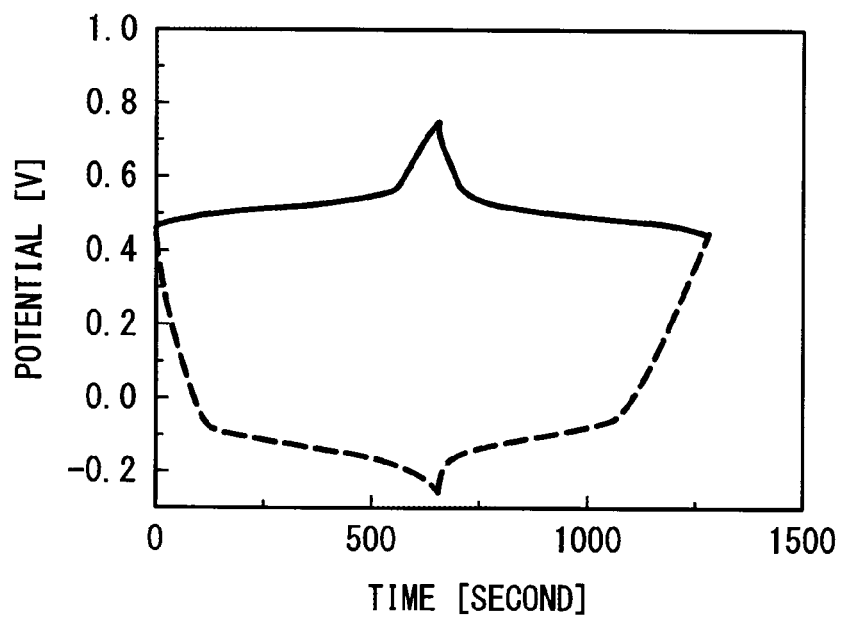
FIG. 9 is a graph of time versus potential in the first embodiment.

FIG. 9 is a graph of time versus potential in the first embodiment. The solid line exhibits the potential of the positive electrode 10 with respect to the reference electrode 20, and the dashed line exhibits the potential of the negative electrode 12 with respect to the reference electrode 20. The period from 0 second to approximately 650 seconds is a charge process, and the period from approximately 650 seconds to approximately 1250 seconds is a discharge process. The average potential of the positive electrode 10 is 0.501 V, and the average potential of the negative electrode 12 is −0.159 V. The reaction potential is approximately 0.65 V. The potential difference between the positive electrode 10 and the negative electrode 12 of FIG. 9 corresponds to the voltage of FIG. 8.

Figure 10:
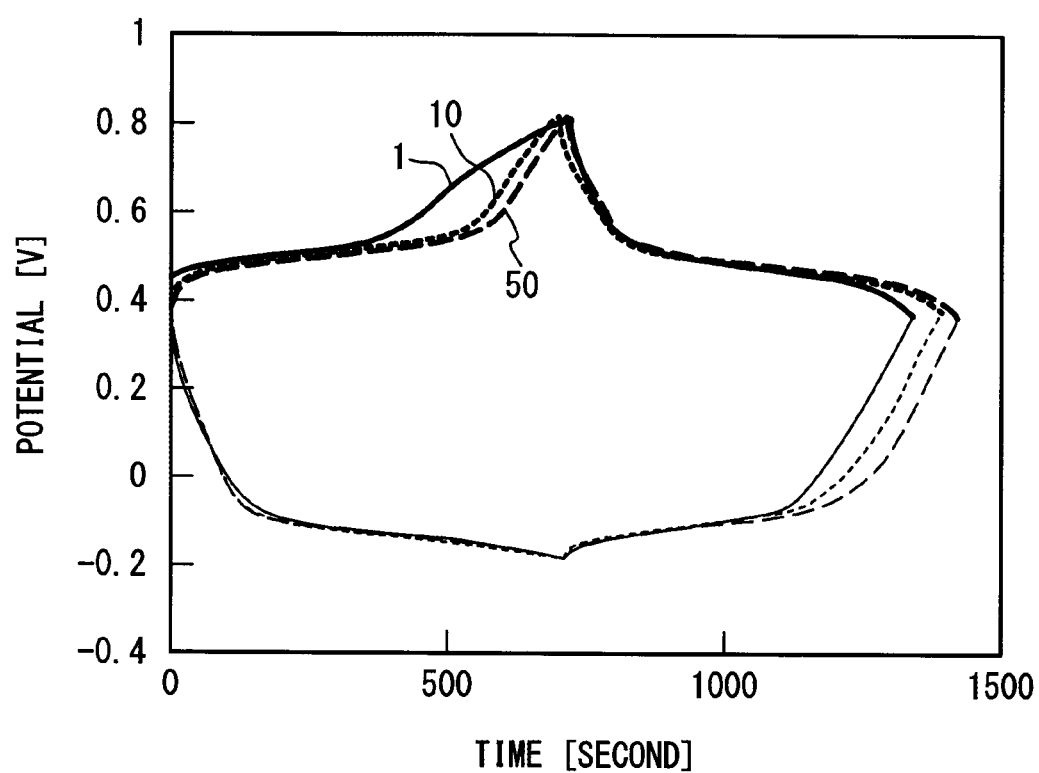
FIG. 10 is a graph of time of each cycle versus potential in the first embodiment.

FIG. 10 is a graph of time of each cycle versus potential in the first embodiment. The numerals assigned to the curves in FIG. 10 indicate cycles. The cycle is the number of times of repetition of charge/discharge. The bold line exhibits the potential of the positive electrode 10 with respect to the reference electrode 20, and the thin line exhibits the potential of the negative electrode 12 with respect to the reference electrode 20. This is applicable to FIG. 11 through FIG. 13 and FIG. 15.

Table 2 lists energy density in each cycle and capacitance (bipolar) of an electric double layer capacitor (EDLC) in the first embodiment.

TABLE 2

| | Cycle | | | |
|---|---|---|---|---|
| | 1 | 10 | 50 | 150 |
| Energy Density (Wh/kg) | 14.5 | 17.6 | 17.1 | 3.5 |
| EDLC Capacitance (F/g) | 105 | 127 | 123 | 26 |

As exhibited in FIG. 10 and Table 2, the energy density is approximately 14 Wh/kg at the 1st cycle, and approximately 18 Wh/kg at the 50th cycle. The EDLC capacitance is calculated from $E=½×C×V^2$ where E represents energy density, C represents EDLC capacitance, and V represents voltage. The energy density and the EDLC capacitance at the 10th cycle are greater than those at the 1st cycle. The energy density and the EDLC capacitance at the 50th cycle are almost the same as those at the 10th cycle. It is not exhibited, but the energy density remains almost the same till the 100th cycle. Bubbling of nitrogen gas is stopped at the 100th cycle. At the 150th cycle, the energy density decreases. As described above, the reduction in the concentration of oxygen in the electrolyte 14 by nitrogen bubbling enables to prolong the lifetime.

Second Embodiment

Table 3 lists the material of the positive electrode 10, the material of the negative electrode 12, the weight ratio of the positive electrode 10 to the negative electrode 12, the concentration of sulfuric acid in the electrolyte 14, the reference electrode 20, and the C rate in the second embodiment.

TABLE 3

| Positive electrode | | Negative electrode | |
|---|---|---|---|
| Chloranol | 26 wt % | AQ | 26 wt % |
| Activated carbon 1 | 64 wt % | Activated carbon 1 | 64 wt % |
| PTFE | 10 wt % | PTFE | 10 wt % |
| Positive electrode/Negative electrode | | 1/1.2 | |
| Electrolyte | | 0.5 mol/l $H_2SO_4$ | |
| Reference electrode | | Ag/AgCl | |
| C rate | | 5 C (Chloranol basis) | |

As listed in Table 3, the weight ratio of the positive electrode 10 to the negative electrode 12 was fixed at 1:1.2. The C rate was on a tetrachlorohydroquinone basis. Other materials used, the fabrication method of the positive electrode 10 and the negative electrode 12, and the measurement method of charge characteristics and discharge characteristics were the same as those of the first embodiment, and thus the description is omitted.

Figure 11:
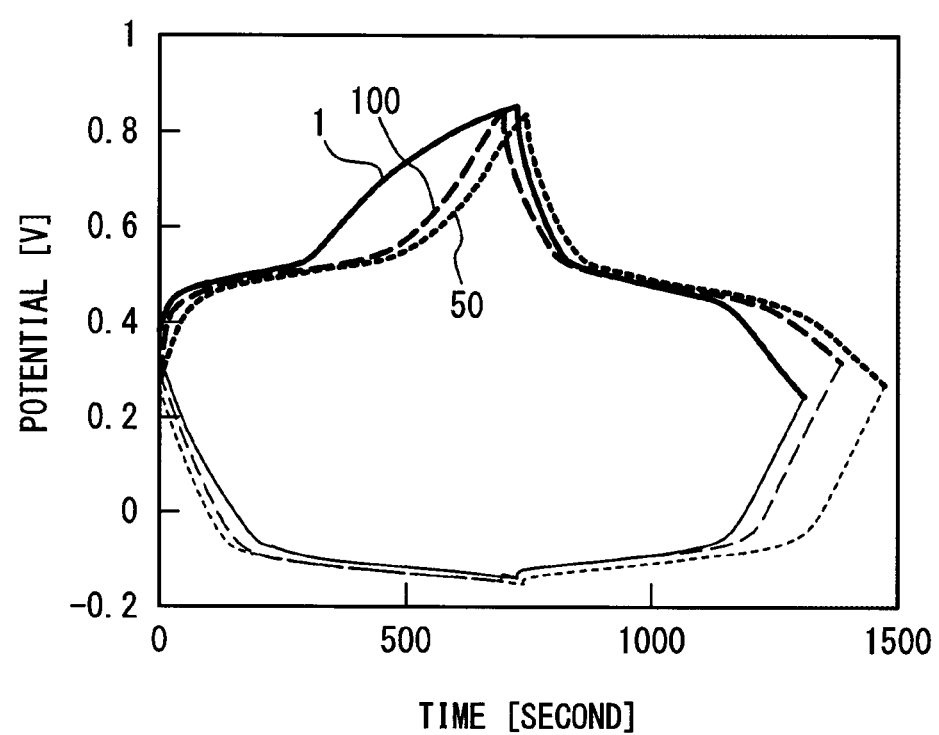
FIG. 11 is a graph of time of each cycle versus potential in the second embodiment.

FIG. 11 is a graph of time of each cycle versus potential in the second embodiment. Table 4 lists energy density in each cycle in the second embodiment.

TABLE 4

|  | Cycle | | |
| --- | --- | --- | --- |
|  | 1 | 50 | 100 |
| Energy Density (Wh/kg) | 10.7 | 13.8 | 12.7 |

As exhibited in FIG. 11 and Table 4, the energy density ranges from approximately 10 Wh/kg to 13 Wh/kg. Additionally, the energy density little decreases till the 100th cycle. The second embodiment has a small energy density compared to the first embodiment, but has an energy density of 10 Wh/kg or greater.

Third Embodiment

Table 5 lists the material of the positive electrode 10, the material of the negative electrode 12, the weight ratio of the positive electrode 10 to the negative electrode 12, the concentration of sulfuric acid in the electrolyte 14, the reference electrode 20, and the C rate in the third embodiment.

TABLE 5

| Positive electrode | | Negative electrode | |
| --- | --- | --- | --- |
| Chloranol | 26 wt % | AQ | 26 wt % |
| Activated carbon 1 | 64 wt % | Activated carbon 1 | 64 wt % |
| PTFE | 10 wt % | PTFE | 10 wt % |
| Positive electrode/Negative electrode | | 1/1.2 | |
| Electrolyte | | 1.75 mol/l $H_2SO_4$ | |
| Reference electrode | | Ag/AgCl | |
| Crate | | 10 C (Chloranol basis) | |

As listed in Table 5, the concentration of the electrolyte 14 was set at 1.75 mol/liter. Other materials used, the fabrication method of the positive electrode 10 and the negative electrode 12, the measurement method of charge characteristics and discharge characteristics were the same as those of the second embodiment, and thus the description is omitted.

Figure 12:
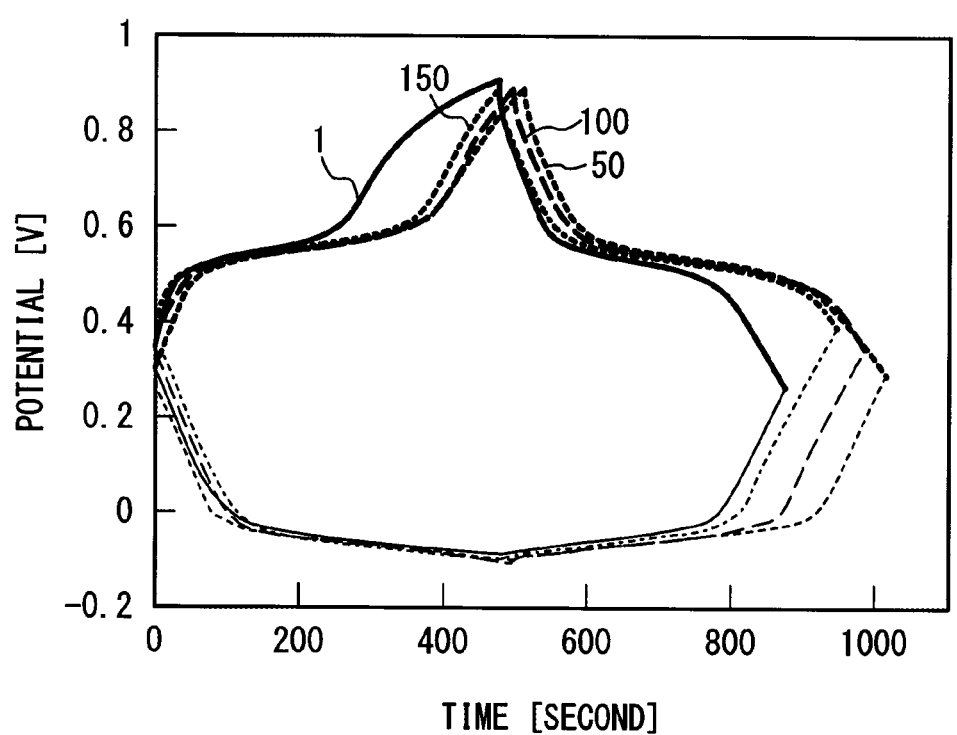
FIG. 12 is a graph of time of each cycle versus potential in the third embodiment.

FIG. 12 is a graph of time of each cycle versus potential in the third embodiment. Table 6 lists energy density in each cycle in the third embodiment.

TABLE 6

|  | Cycle | | | |
| --- | --- | --- | --- | --- |
|  | 1 | 50 | 100 | 150 |
| Energy Density (Wh/kg) | 13.4 | 17.4 | 16.8 | 15.9 |

As exhibited in FIG. 12 and Table 6, the energy density ranges from approximately 13 Wh/kg to 18 Wh/kg. In addition, the energy density little decreases till the 150th cycle. The third embodiment made the C rate double the C rate of the first embodiment, but has the energy density same as that of the first embodiment.

As described in the first through third embodiments, appropriate setting of the ratio of the positive electrode 10 to the negative electrode 12 and the concentration of sulfuric acid in the electrolyte 14 enables to optimize the energy density and the C rate.

Fourth Embodiment

Table 7 lists the material of the positive electrode 10, the material of the negative electrode 12, the weight ratio of the positive electrode 10 to the negative electrode 12, the concentration of sulfuric acid in the electrolyte 14, the reference electrode 20, and the C rate in the fourth embodiment.

TABLE 7

| Positive electrode | | Negative electrode | |
| --- | --- | --- | --- |
| Chloranol | 23 wt % | AQ | 23 wt % |
| Activated carbon 2 | 57 wt % | Activated carbon 2 | 57 wt % |
| KB | 10 wt % | KB | 10 Wt % |
| PTFE | 10 wt % | PTFE | 10 wt % |
| Positive electrode/Negative electrode | | 1/1 | |
| Electrolyte | | 0.5 mol/l $H_2SO_4$ | |
| Reference electrode | | Ag/AgCl | |
| C rate | | 5 C (AQ basis) | |

As listed in Table 7, activated carbon 2 was used as activated carbon of the positive electrode 10 and the negative electrode 12. Palm husk carbon was used as activated carbon 2. Palm husk carbon is inexpensive compared to Maxsorb (registered trademark), but has a small number of pores with a radius of 3 nm or less. In addition, carbon black (KB) is added to the positive electrode 10 and the negative electrode 12. As with in a typical electricity storage device, the addition of carbon black improves capacity. Other materials used, the fabrication method of the positive electrode 10 and the negative electrode 12, and the measurement method of charge characteristics and discharge characteristics were the same as those of the first embodiment, and thus the description is omitted.

Figure 13:
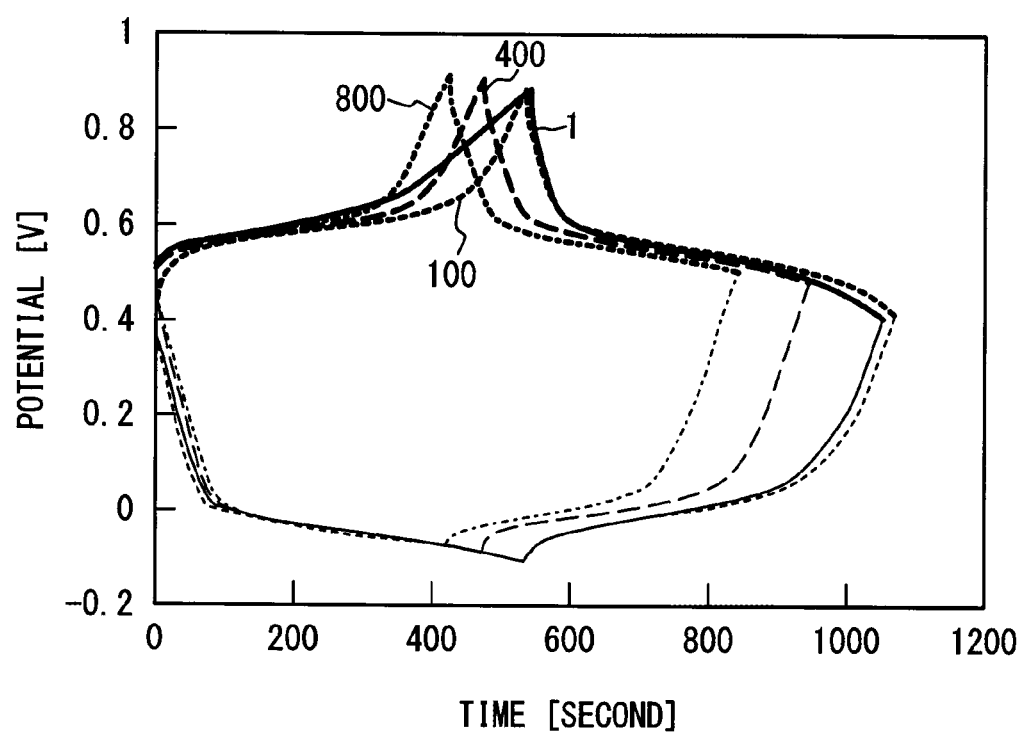
FIG. 13 is a graph of time of each cycle versus potential in the fourth embodiment.
Figure 14:
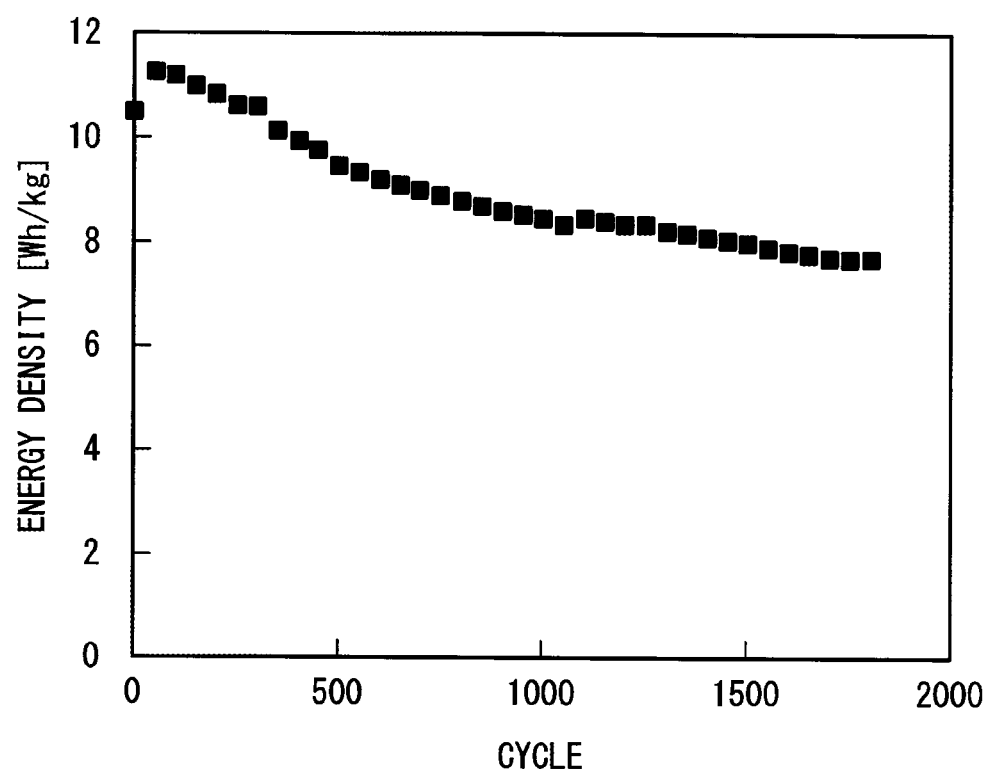
FIG. 14 is a graph of cycle versus energy density in the fourth embodiment.

FIG. 13 is a graph of time of each cycle versus potential in the fourth embodiment. FIG. 14 is a graph of cycle versus energy density in the fourth embodiment. As exhibited in FIG. 13 and FIG. 14, the energy density ranges from 8 Wh/kg to 12 Wh/kg. As the cycle number increases, the energy density decreases. However, even at the 1800th cycle, the energy density is approximately 80% of the energy density at the 1st cycle. As described above, the decrease in the energy density due to charge/discharge cycles is small.

According to the fourth embodiment, a large energy density of approximately 10 Wh/kg can be achieved even when inexpensive palm husk carbon is used. In addition, the degradation is small even when about 2000 charge/discharge cycles are carried out.

Fifth Embodiment

Table 8 lists the material of the positive electrode 10, the material of the negative electrode 12, the weight ratio of the positive electrode 10 to the negative electrode 12, the concentration of sulfuric acid in the electrolyte 14, the reference electrode 20, and the C rate in the fifth embodiment.

TABLE 8

| Positive electrode | | Negative electrode | |
|---|---|---|---|
| Chloranol | 26 wt % | 1,5-dichloroanthraquinone | 26 wt % |
| Activated carbon 1 | 64 wt % | Activated carbon 1 | 64 wt % |
| PTFE | 10 wt % | PTFE | 10 wt % |
| Positive electrode/Negative electrode | 1/1 | | |
| Electrolyte | 0.5 mol/l $H_2SO_4$ | | |
| Reference electrode | Ag/AgCl | | |
| C rate | 5 C (1,5-dichloroanthraquinone basis) | | |

As listed in Table 8, 1,5-dichloroanthraquinone (DCAQ) was used as the negative electrode active material. The C rate was on a 1,5-dichloro anthraquinone basis. Other materials used, the fabrication method of the positive electrode 10 and the negative electrode 12, and the measurement method of charge characteristics and discharge characteristics were the same as those of the first embodiment, and thus the description is omitted.

Figure 15:
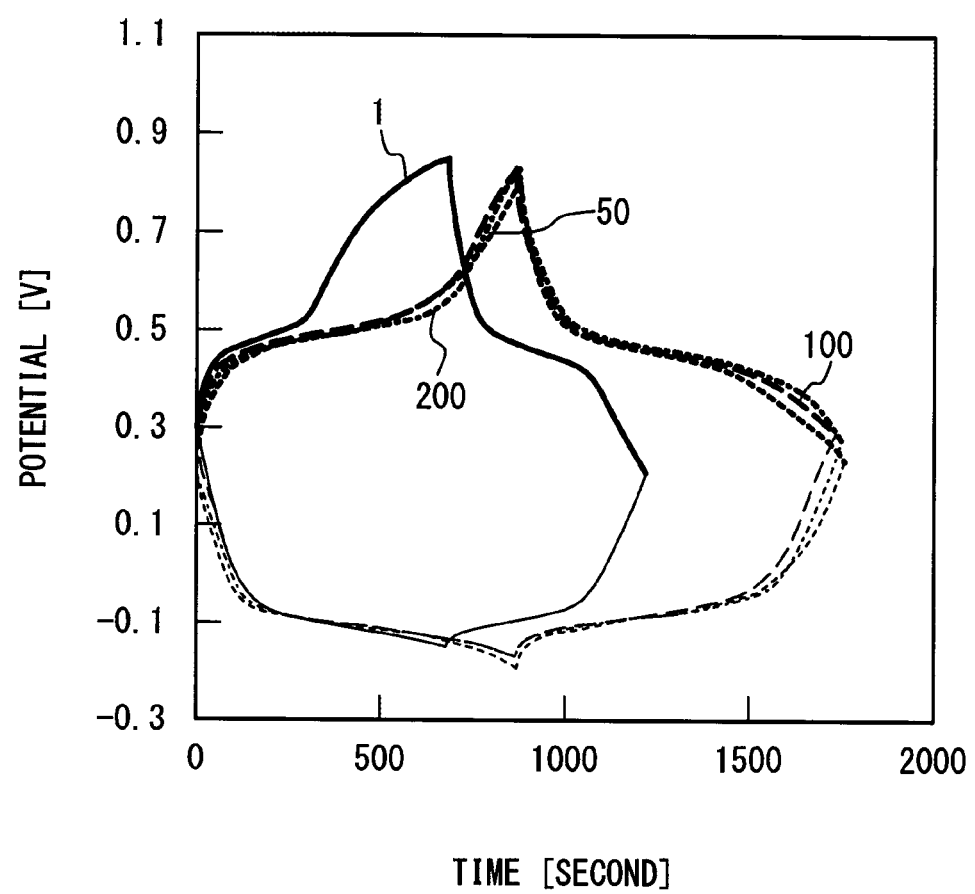
FIG. 15 is a graph of time of each cycle versus potential in the fifth embodiment.

FIG. 15 is a graph of time of each cycle versus potential in the fifth embodiment. Table 9 lists energy density in each cycle in the fifth embodiment.

TABLE 9

| | Cycle | | | |
|---|---|---|---|---|
| | 1 | 50 | 100 | 200 |
| Energy Density (Wh/kg) | 9.1 | 14.7 | 14.8 | 15.4 |

As exhibited in FIG. 15 and Table 9, the energy density ranges from approximately 9 Wh/kg to approximately 16 Wh/kg. The energy density improves till the 200th cycle. The energy density slightly decreases after 10 cycles in the first embodiment, while the energy density improves till the 200th cycle in the fifth embodiment. The reason is considered as follows. Not only the positive electrode active material but also the negative electrode active material has a halogen group, and the elution of the negative electrode active material into the electrolyte is reduced accordingly. When 1,8-dichloroanthraquinone was used as the active material, it was difficult to reduce the elution into the electrolyte 14 compared to when 1,5-dichloro anthraquinone was used. This result reveals that a halogen group is preferably located at point-symmetric positions in quinone or hydroquinone.

As described in the first through fifth embodiments, when the positive electrode active material and/or the negative electrode active material has a halogen group, the elution of the positive electrode active material and/or the negative electrode active material into the electrolyte can be reduced, and charge-discharge cycle characteristics can be improved. Quinone and/or hydroquinone that the negative electrode active material mainly includes has a small number of benzene rings, and thus preferably has a halogen group. As described in the fifth embodiment, both quinone and/or hydroquinone that the negative electrode active material mainly includes and quinone and/or hydroquinone that the positive electrode active material mainly include preferably have a halogen group.

The first through fifth embodiments can achieve the energy density of approximately 20 Wh/kg, which is the energy density of a lead secondary cell, by using a rare element and an element having high toxicity. The optimization of the porous body, the active material, and the electrolyte enables to achieve higher energy density.

Investigated was whether the active material was located in the pore of the porous body. A composite of activated carbon 1 (Maxsorb (registered trademark)) and anthraquinone (AQ) with a weight ratio of 2:5 was fabricated with the same method as that of the embodiments. Furthermore, a composite of activated carbon 1 and naphthaquinone (NQ) with a weight ratio of 2:5 was fabricated with the same method as that of the embodiments.

Figure 16:
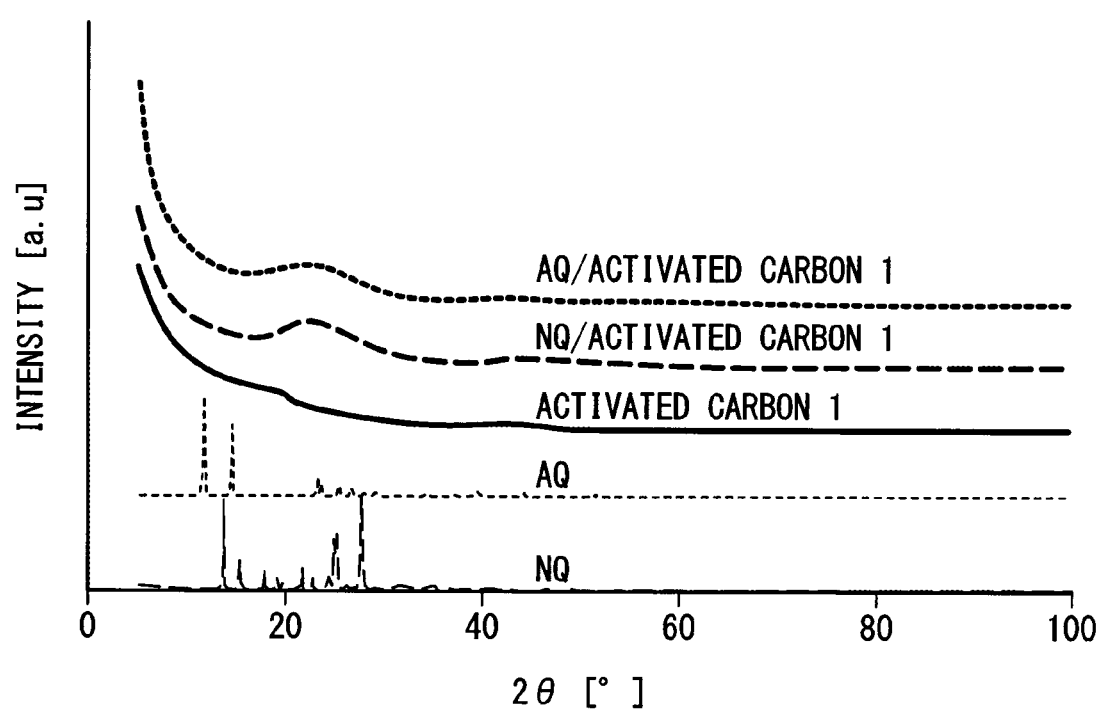
FIG. 16 illustrates results of an X-ray diffraction analysis.

Investigated were crystal structures of a simple substance of AQ, a simple substance of NQ, a simple substance of activated carbon 1, a composite of AQ and activated carbon 1, a composite of NQ and activated carbon 1 with an X-ray diffraction analysis (XRD) method. FIG. 16 illustrates results of the X-ray diffraction analysis. As exhibited in FIG. 16, signals of crystal are observed in AQ and NQ. Activated carbon 1 has many pores, and thus has smooth signals. The composite of AQ and activated carbon 1 and the composite of NQ and activated carbon 1 have smooth signals. This result exhibits that the crystal of AQ or NQ supported in activated carbon 1 is nanometer-sized.

Fabricated were a simple substance of activated carbon 1, and a composite in which AQ of 10 wt % to 50 wt % is added to activated carbon 1. Measured was an area distribution per unit weight of activated carbon 1 with respect to a pore radius with Barrett-Joyner-Halenda (BJH). Measured was $dV_m/dr_m$ with respect to a pore radius with nitrogen absorption/desorption measuring Micropore analysis (MP) method. Measured was an area distribution per unit weight with respect to a pore radius of activated carbon 2 (palm husk carbon) with BJH method.

Figure 17:
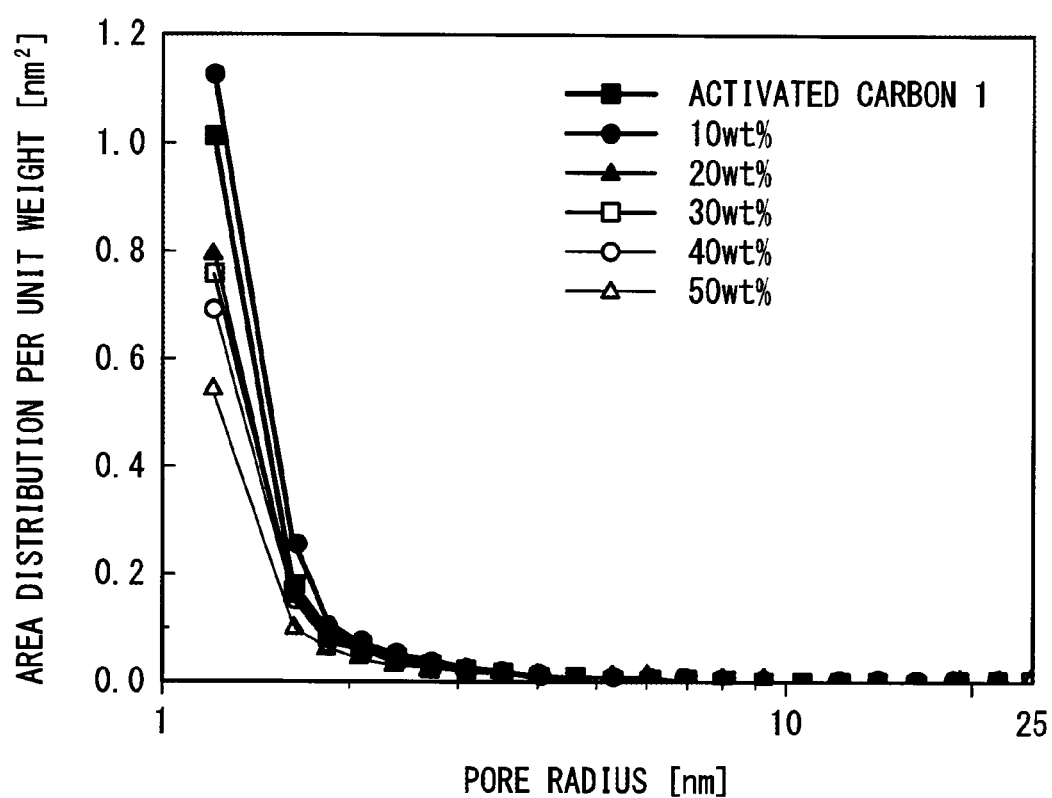
FIG. 17 is a graph of pore radius versus area distribution of pores.
Figure 18:
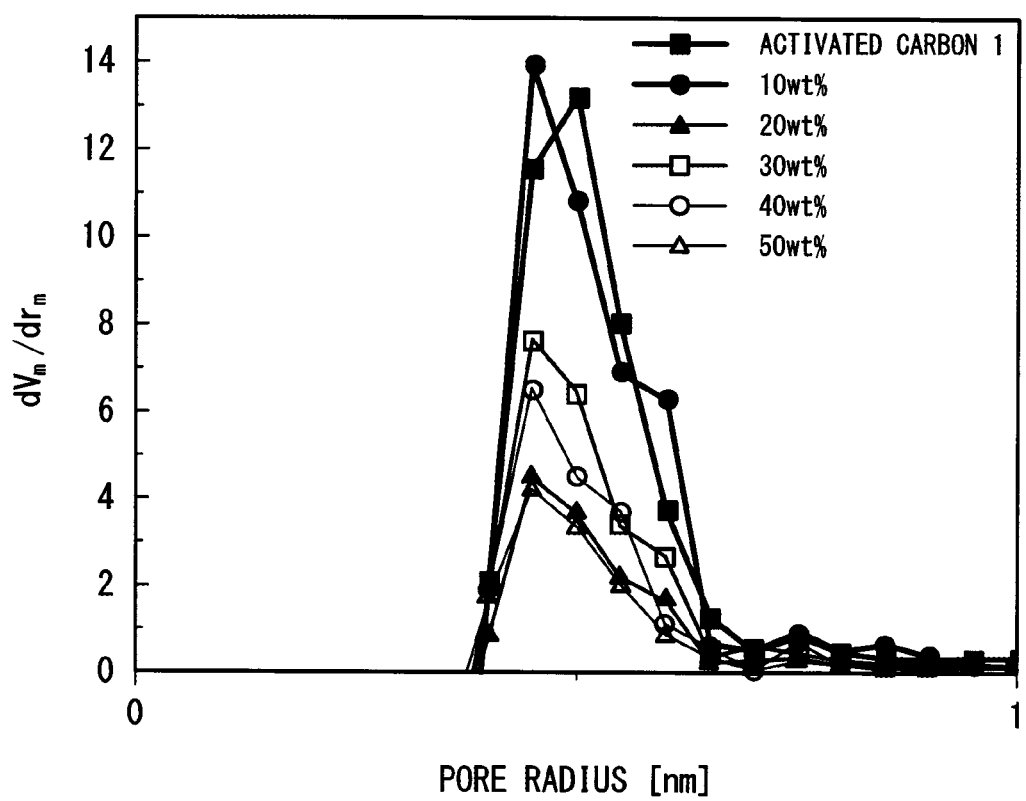
FIG. 18 is a graph of pore radius versus $dV_m/dr_m$.

FIG. 17 is a graph of pore radius versus area distribution. FIG. 18 is a graph of pore radius versus $dV_m/dr_m$. As exhibited in FIG. 17 and FIG. 18, as the concentration of AQ increases, pores with a small radius decrease. In addition, $dV_m/dr_m$ decreases. $DV_m/dr_m$ ($cm^3 \cdot g^{-1} \cdot nm^{-1}$) has a value double the area of each pore. This result exhibits that AQ particles grow in the pore as the concentration of AQ increases.

Figure 19:
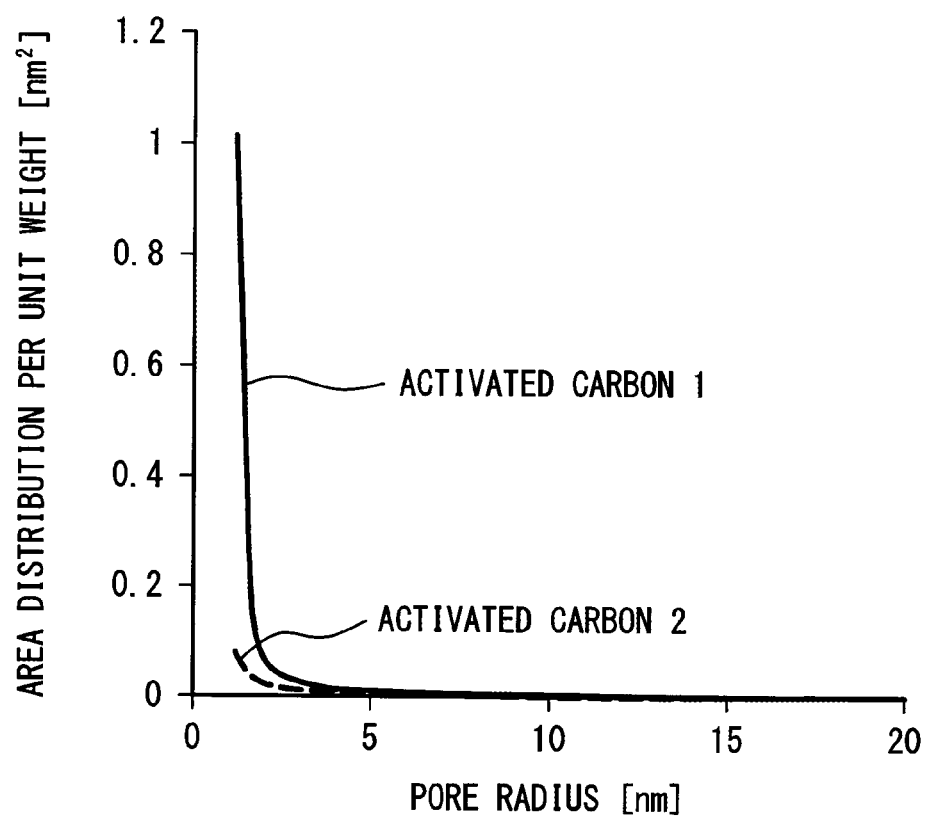
FIG. 19 is a graph of pore radius versus area distribution.

FIG. 19 is a graph of pore radius versus area distribution. In FIG. 19, the solid line exhibits activated carbon 1, and the dashed line exhibits activated carbon 2. Activated carbon 1 has more pores with a radius of 3 nm or less than the activated carbon 2, and has especially numerous pores with a radius of 2 nm or less. The reason why the first embodiment has the energy density higher than that of the fourth embodiment is considered to be because the first embodiment has more pores with a small radius (e.g., micro pores with a radius of 2 nm or less) than the fourth embodiment.

Figure 20:
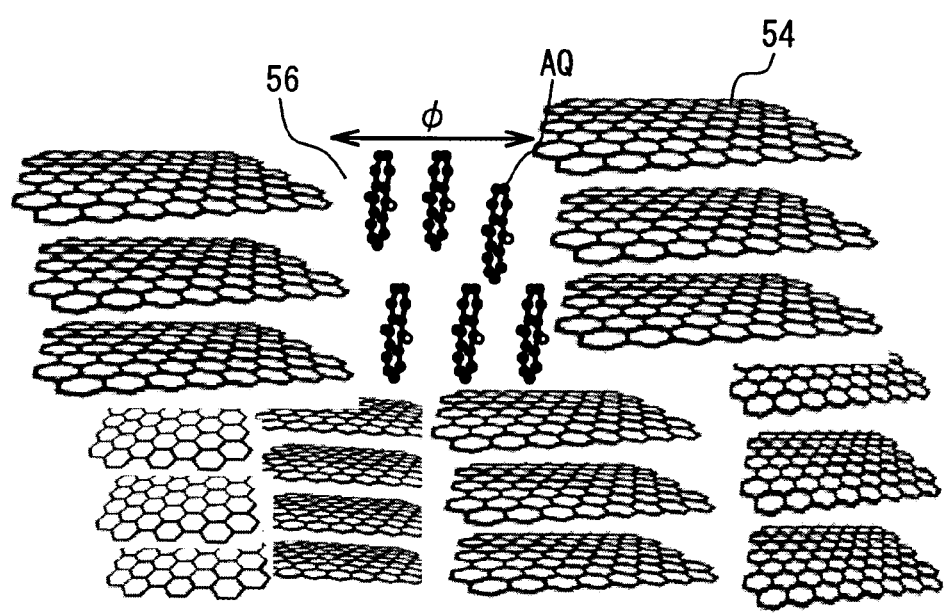
FIG. 20 is a schematic view illustrating quinone in a pore.

FIG. 20 is a schematic view illustrating quinone in a pore. A pore 56 is formed in molecules 54 of the porous body. AQ becomes particles as quinone and/or hydroquinone in the pore 56. As illustrated, quinone and/or hydroquinone that is the active material is crystalized in the pore 56 of the porous body.

As described above, when the area distribution of pores having a small radius in the porous body is large, the porous body can support more quinone and/or hydroquinone in the pores. Accordingly, the energy density of the electricity storage device is improved. In the porous body, an area of micro pores with a diameter of 2 nm or less is preferably 50% or greater of the entire surface area, and more preferably 70% or greater. This improves the energy density of the electricity storage device.

Sixth Embodiment

Figure 21A:
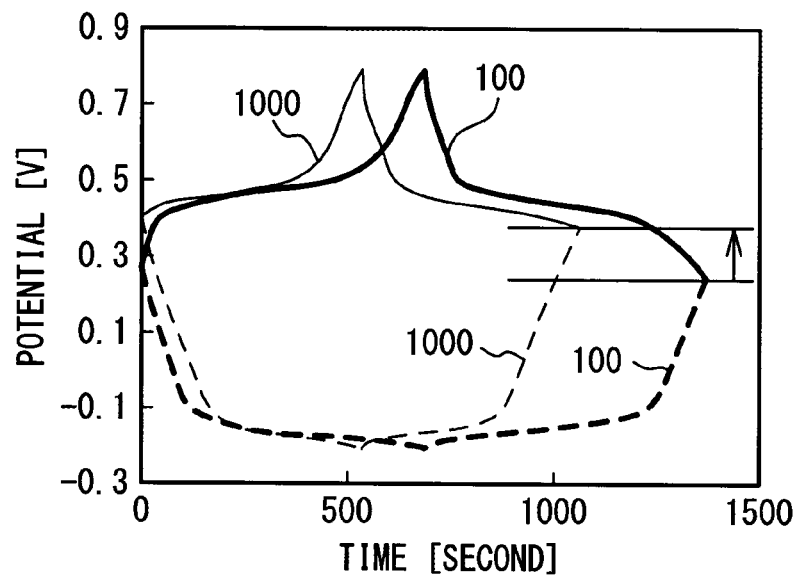
FIG. 21A is a graph of time versus voltage in a sixth embodiment.
Figure 21B:
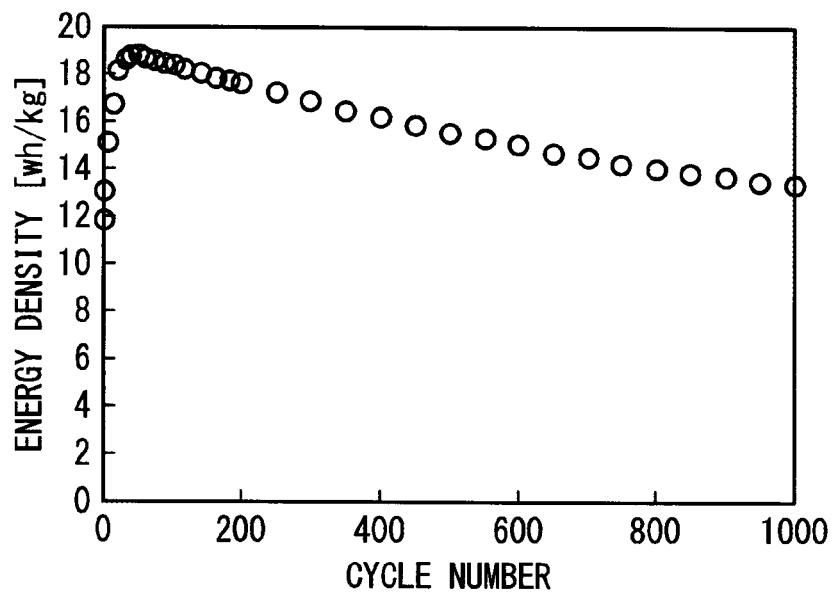
FIG. 21B is a graph of cycle versus energy density.

A sixth embodiment measured charge/discharge characteristics of an electricity storage device having the same configuration as that of Table 1 of the first embodiment till the 1000th cycle. FIG. 21A is a graph of time versus voltage in the sixth embodiment, and FIG. 21B is a graph of cycle versus energy density. The numerals assigned to the curves in FIG. 21A indicate the cycle number. As exhibited in FIG. 21A, the voltage when the cell voltage is 0 V at the 1000th cycle increases to the positive electrode side compared to that at the 100th cycle (see the arrow). This indicates that energy loss is caused by the degradation of the negative electrode. As exhibited in FIG. 21B, the maximum energy density is approximately 19 Wh/kg, and the energy density then decreases as the cycle number increases. The energy density at the 1000th cycle is approximately 71% of the maximum energy density. As described above, charge/discharge characteristics are favorable till the 1000th cycle.

Additionally, measured were capacities of the negative electrode and the positive electrode from the charge/discharge curve at the 50th cycle in the electricity storage device of the sixth embodiment. The capacity of the negative electrode was 199 mAh/g. This is 77% of 257 mAh/g that is the theoretical capacity of anthraquinone. The capacity of the positive electrode was 186 mAh/g. This is 86% of 216 mAh/g that is the theoretical capacitance of tetrachlorohydroquinone. As described above, the capacity close to the theoretical capacity was obtained.

Seventh Embodiment

Figure 22A:
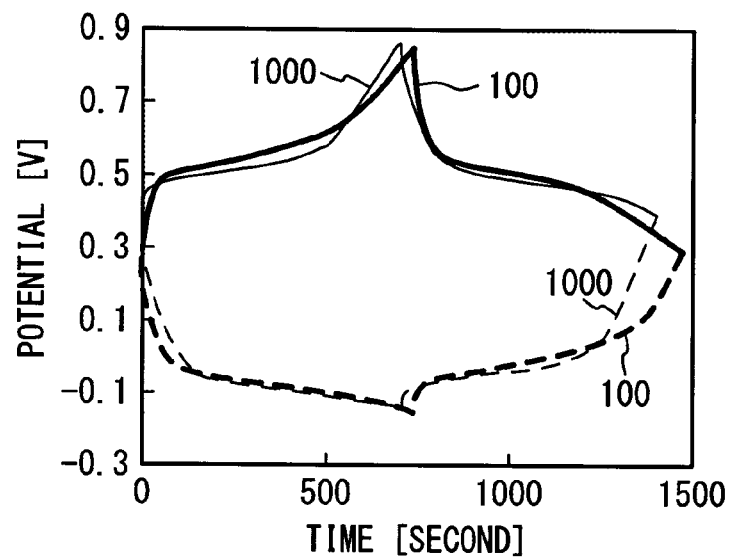
FIG. 22A is a graph of time versus voltage in a seventh embodiment.
Figure 22B:
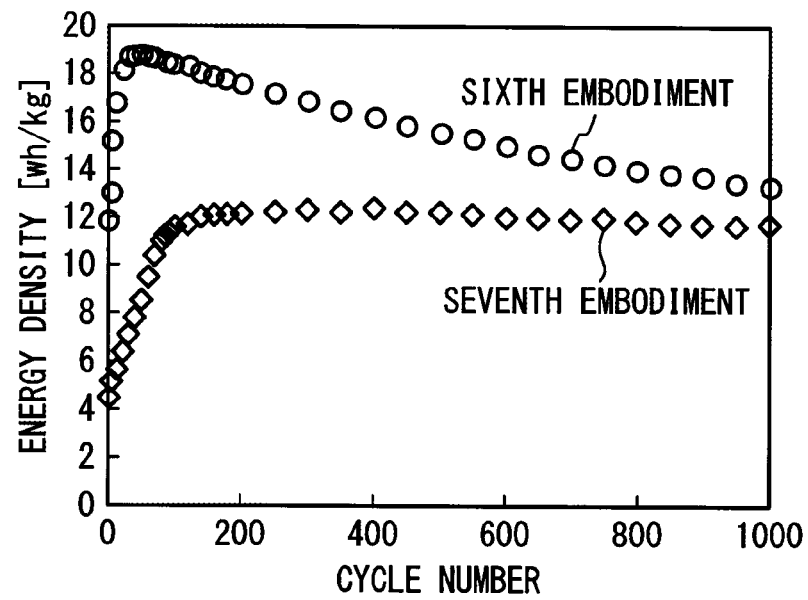
FIG. 22B is a graph of cycle versus energy density.

A seventh embodiment measured charge/discharge characteristics till the 1000th cycle in an electricity storage device having the same configuration as that of Table 8 of the fifth embodiment. FIG. 22A is a graph of time versus voltage in the seventh embodiment, and FIG. 22B is a graph of cycle versus energy density. The numerals assigned to the curves in FIG. 22A indicate the cycle number. FIG. 22B exhibits the sixth embodiment and the seventh embodiment. As exhibited in FIG. 22A, charge/discharge characteristics little change at the 100th cycle and the 1000th cycle. As exhibited in FIG. 22B, the maximum energy density of the seventh embodiment is approximately 12 Wh/kg. The energy density at the 1000th cycle is approximately 95% of the maximum energy density. As described above, by replacing change of the negative electrode active material from anthraquinone of the sixth embodiment to 1,5-dichloroanthraquinone of the seventh embodiment enables to reduce the degradation of the energy density resulting from charge/discharge cycles. This is because the negative electrode active material has a halogen group, thus reducing the elution of the negative electrode active material into the electrolyte.

Eighth Embodiment

Figure 23A:
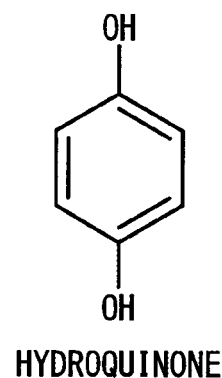
FIG. 23A illustrates a molecular formula of hydroquinone.

To confirm the effect of a hydro group, the positive electrode active material was made to be hydroquinone (first comparative example) or tetrachlorohydroquinone (eighth embodiment), and the negative electrode was made to be only activated carbon. Other configurations were the same as those of the first embodiment. FIG. 23A illustrates a molecular formula of hydroquinone. As illustrated in FIG. 23A, unlike tetrachloroquinone of FIG. 2B, a chloro group is not bonded to hydroquinone.

Figure 23B:
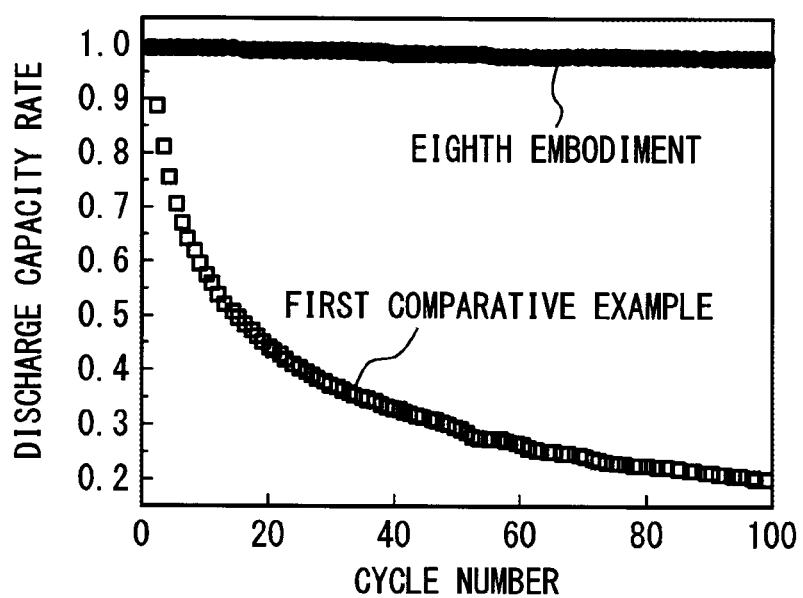
FIG. 23B is a graph of cycle number versus discharge capacity rate.

From the voltage and the electrical current density characteristics, it has been confirmed that the eighth embodiment has higher potential than the first comparative example. This is due to the electron attracting property of the chloro group. FIG. 23B is a graph of cycle number versus discharge capacity rate. As exhibited in FIG. 23B, in a first comparative example, as the cycle number increases, the discharge capacity rate decreases. In contrast, in the eighth embodiment, the discharge capacity rate little changes even when the cycle number increases. As described above, both high potential reaction and cycle characteristics can be achieved by making the active material have a halogen group.

The detailed descriptions have been given of the embodiments of the present invention, but the present invention is not limited to the above-mentioned embodiments, and it is apparent from the above descriptions that other embodiments, variations and modifications may be made without departing from the scope of the present invention.

DESCRIPTION OF LETTERS OR NUMERALS 10 positive electrode
12 negative electrode
14 electrolyte
30 positive electrode porous body
32 negative electrode porous body
34 positive electrode active material
36 negative electrode active material
56 pore

The invention claimed is:

1. An electrode material for electricity storage devices comprising:
    an active material including at least one of quinone having a halogen group and hydroquinone having a halogen group; and
    a porous body supporting the active material.

2. The electrode material for electricity storage devices according to claim 1, wherein
    the porous body includes activated carbon or nanocarbon.

3. The electrode material for electricity storage devices according to claim 1, wherein
    the halogen group is a chloro group.

4. An electricity storage device, wherein
    at least one of a positive electrode and a negative electrode includes the electrode material for electricity storage devices according to claim 1.

5. An electricity storage device comprising:
    a positive electrode that contains a positive electrode active material including at least one of quinone and hydroquinone, and a positive electrode porous body supporting the positive electrode active material;
    a negative electrode that contains a negative electrode active material including at least one of quinone and hydroquinone, and a negative electrode porous body supporting the negative electrode active material; and
    an electrolyte located between the positive electrode and the negative electrode, wherein
    the at least one of quinone and hydroquinone included in at least one of the positive electrode active material and the negative electrode active material has a halogen group.

6. The electricity storage device according to claim 5, wherein
    at least one of quinone and hydroquinone included in the negative electrode active material includes more benzene rings than at least one of quinone and hydroquinone included in the positive electrode active material.

7. The electricity storage device according to claim 5, wherein
    at least one of quinone and hydroquinone included in the negative electrode active material has the halogen group.

8. The electricity storage device according to claim 5, wherein
    both at least one of quinone and hydroquinone included in the negative electrode active material and at least one of quinone and hydroquinone included in the positive electrode active material have the halogen group.

* * * * *